US011729203B2

(12) United States Patent
Kras et al.

(10) Patent No.: US 11,729,203 B2
(45) Date of Patent: *Aug. 15, 2023

(54) SYSTEM AND METHODS OF CYBERSECURITY ATTACK SIMULATION FOR INCIDENT RESPONSE TRAINING AND AWARENESS

(71) Applicant: KnowBe4, Inc., Clearwater, FL (US)

(72) Inventors: Greg Kras, Dunedin, FL (US); Alin Irimie, Clearwater, FL (US)

(73) Assignee: KnowBe4, Inc., Clearwater, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 17/225,931

(22) Filed: Apr. 8, 2021

(65) Prior Publication Data
US 2021/0226985 A1 Jul. 22, 2021

Related U.S. Application Data

(63) Continuation of application No. 16/179,375, filed on Nov. 2, 2018, now Pat. No. 10,979,448.

(51) Int. Cl.
H04L 9/40 (2022.01)
G06N 20/00 (2019.01)

(52) U.S. Cl.
CPC ......... H04L 63/1433 (2013.01); G06N 20/00 (2019.01)

(58) Field of Classification Search
CPC ........................... H04L 63/1433; G06N 20/00
USPC ........................................................ 726/26
See application file for complete search history.

(56) References Cited

U.S. PATENT DOCUMENTS 6,088,804 A * 7/2000 Hill .................. G06F 21/554
726/25
7,599,992 B2 10/2009 Nakajima
8,041,769 B2 10/2011 Shraim et al.
8,464,346 B2 6/2013 Barai et al.
(Continued)

FOREIGN PATENT DOCUMENTS

EP         3 582 468      12/2019
WO    WO-2016/164844 A1  10/2016

OTHER PUBLICATIONS

Abu-Nimeh et al., "A Comparison of Machine Learning Techniques for Phishing Detection," eCrime '07: Proceedings of the anti-phishing working groups 2nd annual eCrime researchers summit, 2007, pp. 60-69, ACM Digital Library.
(Continued)

Primary Examiner — Dant B Shaifer Harriman
(74) Attorney, Agent, or Firm — Foley & Lardner LLP

(57) ABSTRACT

Systems and methods are disclosed that are useful for minimizing organization risk in the case of a cybersecurity attack, through computer-based simulation of cybersecurity attacks, incident response tracking and incident response training provided responsive to the simulation outcome. A server is configured to execute a simulated cybersecurity attack on a plurality of users and their computer systems on a company network associated with a company, tracking responses such as interactions with at least one of the computer systems or network components to the simulated cybersecurity attack and validating whether one or more responses of a predetermined set of responses have occurred to minimize the impact of the simulated security attack on the entity.

20 Claims, 7 Drawing Sheets

(56) References Cited

U.S. PATENT DOCUMENTS

| | | |
|---|---|---|
| 8,484,741 B1 | 7/2013 | Chapman |
| 8,615,807 B1 | 12/2013 | Higbee et al. |
| 8,635,703 B1 | 1/2014 | Belani et al. |
| 8,719,940 B1 | 5/2014 | Higbee et al. |
| 8,793,799 B2 | 7/2014 | Fritzson et al. |
| 8,910,287 B1 | 12/2014 | Belani et al. |
| 8,966,637 B2 | 2/2015 | Belani et al. |
| 9,053,326 B2 | 6/2015 | Higbee et al. |
| 9,246,936 B1 | 1/2016 | Belani et al. |
| 9,253,207 B2 | 2/2016 | Higbee et al. |
| 9,262,629 B2 | 2/2016 | Belani et al. |
| 9,325,730 B2 | 4/2016 | Higbee et al. |
| 9,356,948 B2 | 5/2016 | Higbee et al. |
| 9,373,267 B2 | 6/2016 | Sadeh-Koniecpol et al. |
| 9,398,029 B2 | 7/2016 | Sadeh-Koniecpol et al. |
| 9,398,038 B2 | 7/2016 | Higbee et al. |
| 9,591,017 B1 | 3/2017 | Higbee et al. |
| 9,635,052 B2 | 4/2017 | Hadnagy |
| 9,667,645 B1 | 5/2017 | Belani et al. |
| 9,674,221 B1 | 6/2017 | Higbee et al. |
| 9,729,573 B2 | 8/2017 | Gatti |
| 9,813,454 B2 | 11/2017 | Sadeh-Koniecpol et al. |
| 9,870,715 B2 | 1/2018 | Sadeh-Koniecpol et al. |
| 9,876,753 B1 | 1/2018 | Hawthorn |
| 9,894,092 B2 | 2/2018 | Irimie et al. |
| 9,912,687 B1 | 3/2018 | Wescoe et al. |
| 9,942,249 B2 | 4/2018 | Gatti |
| 9,998,480 B1 | 6/2018 | Gates et al. |
| 10,218,735 B2* | 2/2019 | Strom ............... G06F 30/20 |
| 10,230,752 B2* | 3/2019 | Key ................ H04L 63/1441 |
| 10,243,904 B1 | 3/2019 | Wescoe et al. |
| 10,868,825 B1* | 12/2020 | Dominessy ........ H04L 63/1433 |
| 10,904,186 B1 | 1/2021 | Everton et al. |
| 10,986,122 B2 | 4/2021 | Bloxham et al. |
| 11,044,267 B2 | 6/2021 | Jakobsson et al. |
| 11,184,393 B1 | 11/2021 | Gendre et al. |
| 11,297,094 B2 | 4/2022 | Huda |
| 2007/0142030 A1 | 6/2007 | Sinha et al. |
| 2009/0319249 A1* | 12/2009 | White ............... H04L 41/145 703/13 |
| 2010/0211641 A1 | 8/2010 | Yih et al. |
| 2010/0269175 A1 | 10/2010 | Stolfo et al. |
| 2012/0124671 A1 | 5/2012 | Fritzson et al. |
| 2012/0258437 A1 | 10/2012 | Sadeh-Koniecpol et al. |
| 2013/0198846 A1 | 8/2013 | Chapman |
| 2013/0203023 A1 | 8/2013 | Sadeh-Koniecpol et al. |
| 2013/0219495 A1 | 8/2013 | Kulaga et al. |
| 2013/0297375 A1 | 11/2013 | Chapman |
| 2014/0173726 A1 | 6/2014 | Varenhorst |
| 2014/0199663 A1 | 7/2014 | Sadeh-Koniecpol et al. |
| 2014/0199664 A1 | 7/2014 | Sadeh-Koniecpol et al. |
| 2014/0201835 A1 | 7/2014 | Emigh et al. |
| 2014/0230061 A1 | 8/2014 | Higbee et al. |
| 2014/0230065 A1 | 8/2014 | Belani et al. |
| 2014/0249927 A1* | 9/2014 | De Angelo ........ G06Q 30/0267 705/14.64 |
| 2015/0081384 A1 | 3/2015 | Zeifman |
| 2015/0163242 A1 | 6/2015 | Laidlaw et al. |
| 2015/0180896 A1 | 6/2015 | Higbee et al. |
| 2015/0229664 A1 | 8/2015 | Hawthorn et al. |
| 2016/0036829 A1 | 2/2016 | Sadeh-Koniecpol et al. |
| 2016/0142439 A1 | 5/2016 | Goutal |
| 2016/0162458 A1* | 6/2016 | Munro ............... G06F 16/285 715/230 |
| 2016/0164898 A1 | 6/2016 | Belani et al. |
| 2016/0173510 A1 | 6/2016 | Harris et al. |
| 2016/0234245 A1 | 8/2016 | Chapman |
| 2016/0261618 A1 | 9/2016 | Koshelev |
| 2016/0301705 A1 | 10/2016 | Higbee et al. |
| 2016/0301716 A1 | 10/2016 | Sadeh-Koniecpol et al. |
| 2016/0308897 A1 | 10/2016 | Chapman |
| 2016/0330238 A1 | 11/2016 | Hadnagy |
| 2017/0026410 A1 | 1/2017 | Gatti |
| 2017/0078322 A1 | 3/2017 | Seiver et al. |
| 2017/0103674 A1* | 4/2017 | Sadeh-Koniecpol ...................... G06F 21/566 |
| 2017/0104778 A1 | 4/2017 | Shabtai et al. |
| 2017/0140663 A1 | 5/2017 | Sadeh-Koniecpol et al. |
| 2017/0201530 A1 | 7/2017 | Mead et al. |
| 2017/0237776 A1 | 8/2017 | Higbee et al. |
| 2017/0244746 A1 | 8/2017 | Hawthorn et al. |
| 2017/0251009 A1 | 8/2017 | Irimie et al. |
| 2017/0251010 A1 | 8/2017 | Irimie et al. |
| 2017/0264644 A1* | 9/2017 | Mihan ............... H04L 63/20 |
| 2017/0302683 A1* | 10/2017 | Kawauchi ............ G06F 21/566 |
| 2017/0318046 A1 | 11/2017 | Weidman |
| 2017/0331848 A1 | 11/2017 | Alsaleh et al. |
| 2018/0041537 A1 | 2/2018 | Bloxham et al. |
| 2018/0103052 A1 | 4/2018 | Choudhury et al. |
| 2018/0234443 A1 | 8/2018 | Wolkov et al. |
| 2018/0248896 A1* | 8/2018 | Challita ............... G06F 21/554 |
| 2019/0173819 A1 | 6/2019 | Wescoe et al. |
| 2019/0215335 A1 | 7/2019 | Benishti |
| 2019/0245885 A1 | 8/2019 | Starink et al. |
| 2019/0245894 A1 | 8/2019 | Epple et al. |
| 2020/0311260 A1 | 10/2020 | Klonowski et al. |
| 2021/0185075 A1 | 6/2021 | Adams |
| 2021/0194924 A1 | 6/2021 | Heinemeyer et al. |
| 2021/0407308 A1 | 12/2021 | Brubaker et al. |
| 2022/0005373 A1 | 1/2022 | Nelson et al. |
| 2022/0006830 A1 | 1/2022 | Wescoe |
| 2022/0078207 A1 | 3/2022 | Chang et al. |
| 2022/0094702 A1 | 3/2022 | Saad Ahmed et al. |
| 2022/0100332 A1 | 3/2022 | Haworth et al. |
| 2022/0116419 A1 | 4/2022 | Kelm et al. |
| 2022/0130274 A1 | 4/2022 | Krishna Raju et al. |
| 2022/0286419 A1 | 9/2022 | Stetzer et al. |

OTHER PUBLICATIONS

Final Office Action on U.S. Appl. No. 16/179,375 dated Apr. 13, 2020.

Final Office Action on U.S. Appl. No. 16/179,375 dated Jul. 30, 2019.

Non-Final Office Action on U.S. Appl. No. 16/179,375 dated Apr. 8, 2019.

Non-Final Office Action on U.S. Appl. No. 16/179,375 dated Dec. 31, 2019.

Notice of Allowance on U.S. Appl. No. 16/179,375 dated Feb. 9, 2021.

Palka et al., "Dynamic phishing content using generative grammars," Software Testing, Verification and Validation Workshops (ICSTW), 2015 IEEE Eighth International Conference, Date of Conference: Apr. 13-17, 2015,IEEE Xplore, pp. 1-8.

* cited by examiner

300

Executing a simulated cybersecurity attack on computer systems associated with users on a network of an entity
310

↓

Responsive to monitoring the computer systems and the network, tracking a plurality of responses to the simulated cybersecurity attack
320

↓

Responsive to the responses, validating whether a predetermined set of responses have occurred with at least one of the computer systems or components of the network to minimize the impact of the simulated cybersecurity attack on the entity
330

↓

Recording a length of time for users of the entity to perform one or more predetermined responses
340

↓

Providing electronic cybersecurity response training to one or more users of an entity based on the length of time for users of the entity to perform one or more predetermined responses
350

*Fig.3*

SYSTEM AND METHODS OF CYBERSECURITY ATTACK SIMULATION FOR INCIDENT RESPONSE TRAINING AND AWARENESS

CROSS-REFERENCE TO RELATED APPLICATION

This application is a Continuation of and claims priority to and the benefit of U.S. patent application Ser. No. 16/179,375, titled "SYSTEM AND METHODS OF CYBERSECURITY ATTACK SIMULATION FOR INCIDENT RESPONSE TRAINING AND AWARENESS," and filed on Nov. 2, 2018, the contents of all of which are hereby incorporated herein by reference in its entirety for all purposes.

This disclosure generally relates to security awareness systems and methods useful for minimizing organization risk in the case of a cybersecurity attack, through computer-based simulation of cybersecurity attacks, incident response tracking and incident response training provided responsive to the simulation outcome.

BACKGROUND OF THE DISCLOSURE

Cybersecurity incidents cost companies millions of dollars each year in actual costs and can cause customers to lose trust in an organization. The incidents of cybersecurity attacks and the costs of mitigating the damage is increasing every year.

An example of a cybersecurity attack is ransomware. Ransomware is malicious software that encrypts all the data on a user's system within minutes of entry. Ransomware can be embedded in a phishing email or other phishing message. A ransom is then requested by the attacker in return for the encryption keys to access the encrypted data. Perpetrators of ransomware attacks typically set the ransom at a point such that the victims normally prefer to pay the ransom rather than lose their files forever. Attackers will usually restore the files if the ransom is paid, so that future victims are confident that they will recover their data if they pay the ransom.

The reaction of a company in response to a cybersecurity attack is paramount in terms of minimizing the damage. Other emergency responses are tested regularly to ensure emergency preparedness, for example companies are trained in how to respond to a fire alarm, or how to respond to a lock-down command. Practice ensures that the many parts of a company that need to act in coordination and cooperation do so efficiently and correctly.

Cybersecurity simulations exist, which are designed to test existing network protections and computer systems such as firewalls, etc. to determine if a workstation is vulnerable to infection. User training exists to illustrate to users what cybersecurity attacks are and how to recognize them. Neither of these approaches test the coordinated system response required to prevent or limit damage in the case of an actual attack.

In general, the effectiveness of the corporation's response to a cybersecurity attack should be able to be tested with a simulation that is an integrated part of a security awareness training system.

BRIEF SUMMARY OF THE DISCLOSURE

A computer-based simulation of cybersecurity attacks, incident response tracking and incident response training, may test and validate the responses of an organization and minimize organization risk.

A simulated cybersecurity attack on a plurality of users and their computer systems on a company network associated with a company, may track responses and validate whether one or more predetermined responses have occurred to minimize the impact of the simulated security attack on the entity.

A server may be configured to execute a cybersecurity attack across a plurality of user's computers on a network, monitor the computers and the network for interactions between the computers and the network indicating responses to the attack and compare these responses against predetermined responses that have been identified to minimize the impact of the attack on the company. The predetermined responses may include identification of a primary attack point of the simulated cybersecurity attack, disconnection of one or more infected computer systems from the network, and/or quarantine of one or more computers that are associated with the one or more infected computer systems.

The system can record the length of time for the entity to perform one or more of the predetermined responses, and/or the sequence in which the entity performs one or more of the predetermined responses.

The simulated attack may be a simulated ransomware attack, which uses encryption keys known by the server so that the server can decrypt the files. Predetermined responses to a simulated ransomware attack may additionally include identification of a version of ransomware, isolation of the ransomware, location of decryption keys, and/or reporting to one or more third parties.

Responses of an entity to a simulated cybersecurity attack may be compared by the server to a benchmark of responding to a cybersecurity attack, such as a policy or procedure of the entity. A visual comparison of the responses to the benchmark may be displayed by the server.

The server may display identification of which of the predetermined set of responses occurred or did not occur. In some examples, the server may identify one or more users who were deficient in responding to the simulated cybersecurity attack. The server may determine a user response score, and, in some embodiments, enrolling the user in electronic training based on the user response score. The server may enroll one or more users in electronic training based on the user's response score.

The entity may determine which of the responses minimizes the impact of a cybersecurity attack on the entity.

BRIEF DESCRIPTION OF THE DRAWINGS

The foregoing and other objects, aspects, features, and advantages of the disclosure will become more apparent and better understood by referring to the following description taken in conjunction with the accompanying drawings, in which:

FIG. 3 depicts an implementation of a method for minimizing organization risk in the case of a cybersecurity attack.

DETAILED DESCRIPTION

For purposes of reading the description of the various embodiments below, the following descriptions of the sections of the specifications and their respective contents may be helpful:

Section A describes a network environment and computing environment which may be useful for practicing embodiments described herein.

Section B describes embodiments of systems and methods that are useful minimizing organization risk in the case of a cybersecurity attack, through computer-based simulation of cybersecurity attacks, incident response tracking and incident response training provided responsive to the simulation outcome.

A. Computing and Network Environment

Figure 1A:
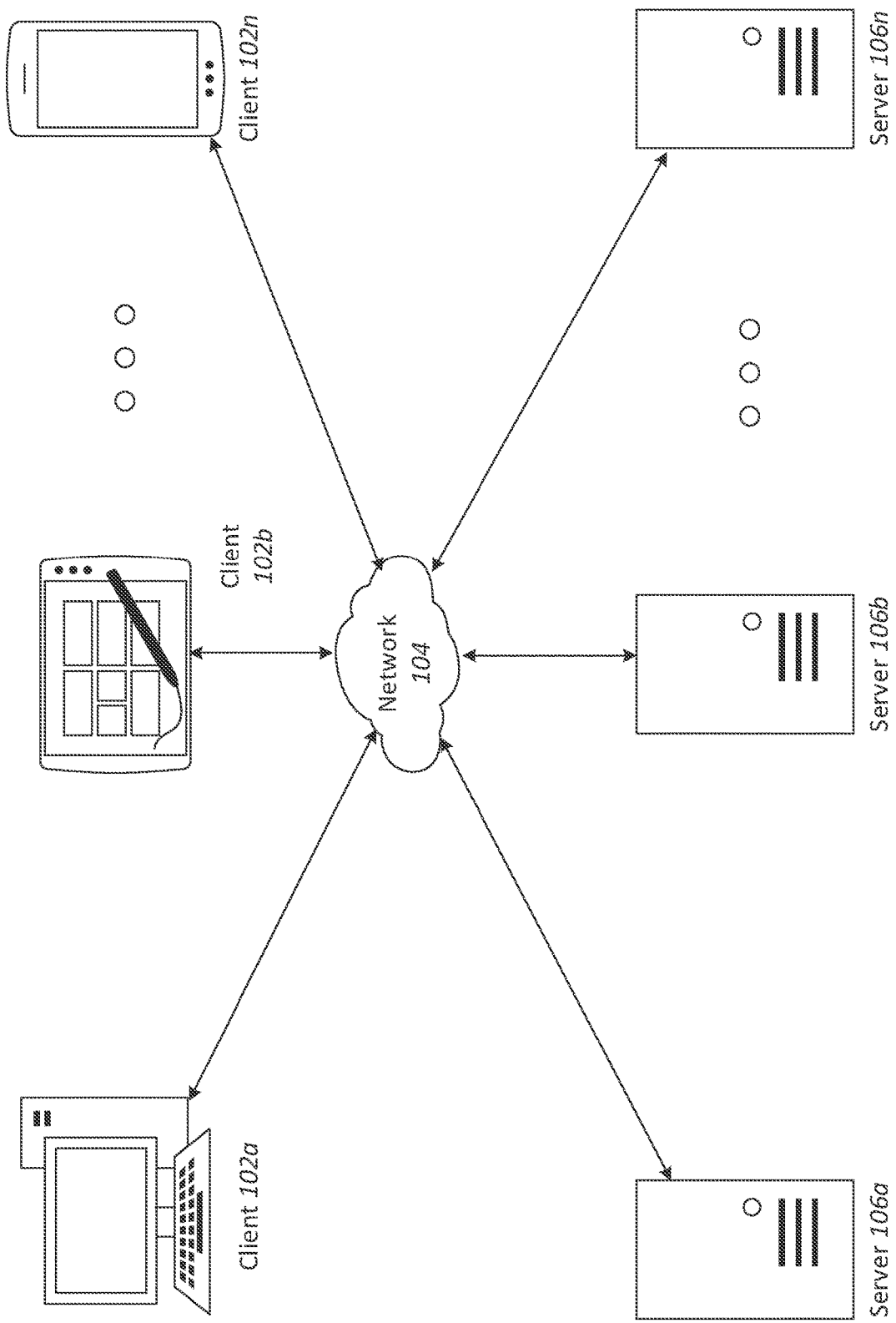
FIG. 1A is a block diagram depicting an embodiment of a network environment comprising client device in communication with server device.

Prior to discussing specific embodiments of the present solution, it may be helpful to describe aspects of the operating environment as well as associated system components (e.g. hardware elements) in connection with the methods and systems described herein. Referring to FIG. 1A, an embodiment of a network environment is depicted. In a brief overview, the network environment includes one or more clients 102a-102n (also generally referred to as local machines(s) 102, client(s) 102, client node(s) 102, client machine(s) 102, client computer(s) 102, client device(s) 102, endpoint(s) 102, or endpoint node(s) 102) in communication with one or more servers 106a-106n (also generally referred to as server(s) 106, node(s) 106, machine(s) 106, or remote machine(s) 106) via one or more networks 104. In some embodiments, a client 102 has the capacity to function as both a client node seeking access to resources provided by a server and as a server providing access to hosted resources for other clients 102a-102n.

Although FIG. 1A shows a network 104 between the clients 102 and the servers 106, the clients 102 and the servers 106 may be on the same network 104. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' may be a public network. In still another of these embodiments, networks 104 and 104' may both be private networks.

The network 104 may be connected via wired or wireless links. Wired links may include Digital Subscriber Line (DSL), coaxial cable lines, or optical fiber lines. Wireless links may include Bluetooth®, Bluetooth Low Energy (BLE), ANT/ANT+, ZigBee, Z-Wave, Thread, Wi-Fi®, Worldwide Interoperability for Microwave Access (WiMAX®), mobile WiMAX®, WiMAX®-Advanced, NFC, SigFox, LoRa, Random Phase Multiple Access (RPMA), Weightless-N/P/W, an infrared channel or a satellite band. The wireless links may also include any cellular network standards to communicate among mobile devices, including standards that qualify as 1G, 2G, 3G, 4G, or 5G. The network standards may qualify as one or more generations of mobile telecommunication standards by fulfilling a specification or standards such as the specifications maintained by the International Telecommunication Union. The 3G standards, for example, may correspond to the International Mobile Telecommuniations-2000 (IMT-2000) specification, and the 4G standards may correspond to the International Mobile Telecommunication Advanced (IMT-Advanced) specification. Examples of cellular network standards include AMPS, GSM, GPRS, UMTS, CDMA2000, CDMA-1×RTT, CDMA-EVDO, LTE, LTE-Advanced, LTE-M1, and Narrowband IoT (NB-IoT). Wireless standards may use various channel access methods, e.g. FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network may vary widely and the network 104 can be a body area network (BAN), a personal area network (PAN), a local-area network (LAN), e.g. Intranet, a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv4 and IPv6), or the link layer. The network 104 may be a type of broadcast network, a telecommunications network, a data communication network, or a computer network.

In some embodiments, the system may include multiple, logically-grouped servers 106. In one of these embodiments, the logical group of servers may be referred to as a server farm or a machine farm. In another of these embodiments, the servers 106 may be geographically dispersed. In other embodiments, a machine farm may be administered as a single entity. In still other embodiments, the machine farm includes a plurality of machine farms. The servers 106 within each machine farm can be heterogeneous—one or more of the servers 106 or machines 106 can operate according to one type of operating system platform (e.g., Windows, manufactured by Microsoft Corp. of Redmond, Wash.), while one or more of the other servers 106 can operate according to another type of operating system platform (e.g., Unix, Linux, or Mac OSX).

In one embodiment, servers 106 in the machine farm may be stored in high-density rack systems, along with associated storage systems, and located in an enterprise data center. In this embodiment, consolidating the servers 106 in this way may improve system manageability, data security, the physical security of the system, and system performance by locating servers 106 and high-performance storage systems on localized high-performance networks. Centralizing the servers 106 and storage systems and coupling them with advanced system management tools allows more efficient use of server resources.

The servers 106 of each machine farm do not need to be physically proximate to another server 106 in the same machine farm. Thus, the group of servers 106 logically grouped as a machine farm may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm can be increased if the servers 106 are connected using a local-area network (LAN) connection or some form of direct connection. Additionally, a heterogeneous machine farm may include one or more servers 106 operating according to a type of operating system, while one or more other servers execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alta, Calif.; the Xen hypervisor, an open source product whose development is overseen by Citrix Systems, Inc. of Fort Lauderdale, Fla.; the HYPER-V hypervisors provided by Microsoft, or others. Hosted hypervisors may run within an operating system on a second software level. Examples of hosted hypervisors may include VMWare Workstation and VirtualBox, manufactured by Oracle Corporation of Redwood City, Calif.

Management of the machine farm may be de-centralized. For example, one or more servers 106 may comprise components, subsystems and modules to support one or more management services for the machine farm. In one of these embodiments, one or more servers 106 provide functionality for management of dynamic data, including techniques for handling failover, data replication, and increasing the robustness of the machine farm. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, a plurality of servers 106 may be in the path between any two communicating servers 106.

Figure 1B:
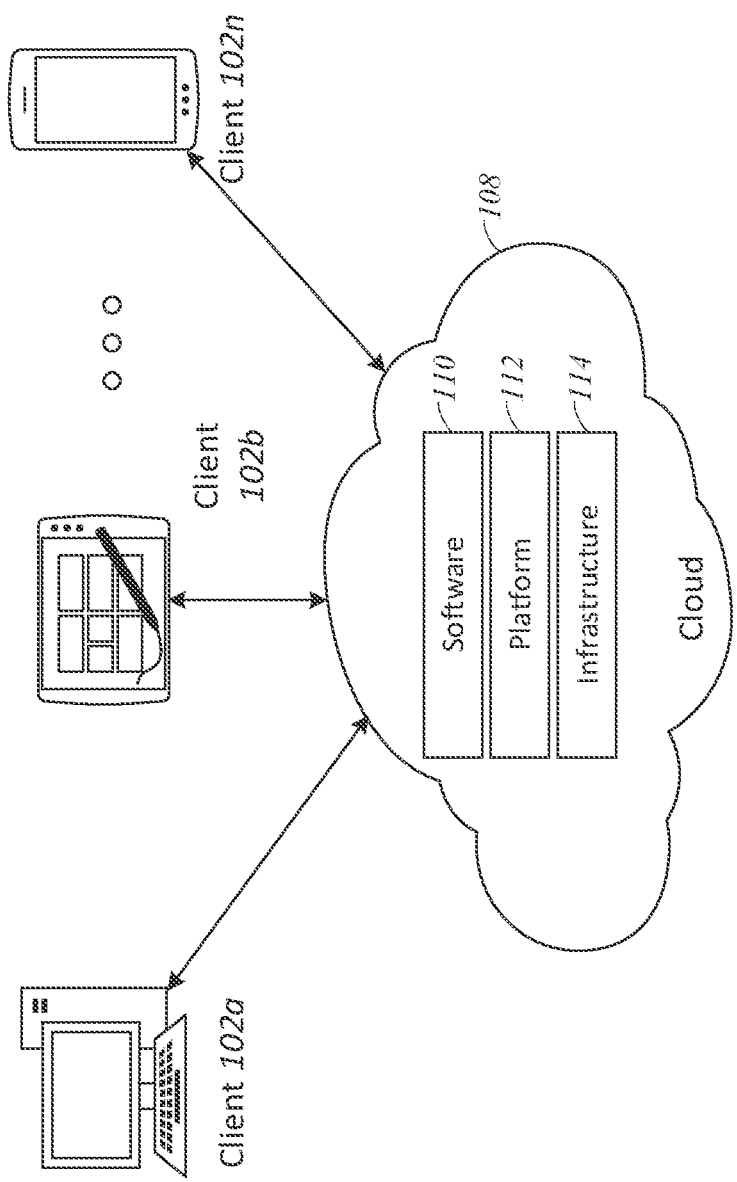
FIG. 1B is a block diagram depicting a could computing environment comprising client device in communication with cloud service providers.

Referring to FIG. 1B, a cloud computing environment is depicted. A cloud computing environment may provide client 102 with one or more resources provided by a network environment. The cloud computing environment may include one or more clients 102a-102n, in communication with the cloud 108 over one or more networks 104. Clients 102 may include, e.g., thick clients, thin clients, and zero clients. A thick client may provide at least some functionality even when disconnected from the cloud 108 or servers 106. A thin client or zero client may depend on the connection to the cloud 108 or server 106 to provide functionality. A zero client may depend on the cloud 108 or other networks 104 or servers 106 to retrieve operating system data for the client device 102. The cloud 108 may include back end platforms, e.g., servers 106, storage, server farms or data centers.

The cloud 108 may be public, private, or hybrid. Public clouds may include public servers 106 that are maintained by third parties to the clients 102 or the owners of the clients. The servers 106 may be located off-site in remote geographical locations as disclosed above or otherwise. Public clouds may be connected to the servers 106 over a public network. Private clouds may include private servers 106 that are physically maintained by clients 102 or owners of clients. Private clouds may be connected to the servers 106 over a private network 104. Hybrid clouds 109 may include both the private and public networks 104 and servers 106.

The cloud 108 may also include a cloud-based delivery, e.g. Software as a Service (SaaS) 110, Platform as a Service (PaaS) 112, and Infrastructure as a Service (IaaS) 114. IaaS may refer to a user renting the user of infrastructure resources that are needed during a specified time period. IaaS provides may offer storage, networking, servers or virtualization resources from large pools, allowing the users to quickly scale up by accessing more resources as needed. Examples of IaaS include Amazon Web Services (AWS) provided by Amazon, Inc. of Seattle, Wash., Rackspace Cloud provided by Rackspace Inc. of San Antonio, Tex., Google Compute Engine provided by Google Inc. of Mountain View, Calif., or RightScale provided by RightScale, Inc. of Santa Barbara, Calif. PaaS providers may offer functionality provided by IaaS, including, e.g., storage, networking, servers or virtualization, as well as additional resources, e.g., the operating system, middleware, or runtime resources. Examples of PaaS include Windows Azure provided by Microsoft Corporation of Redmond, Wash., Google App Engine provided by Google Inc., and Heroku provided by Heroku, Inc. of San Francisco Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include Google Apps provided by Google Inc., Salesforce provided by Salesforce.com Inc. of San Francisco, Calif., or Office365 provided by Microsoft Corporation. Examples of SaaS may also include storage providers, e.g. Dropbox provided by Dropbox Inc. of San Francisco, Calif., Microsoft OneDrive provided by Microsoft Corporation, Google Drive provided by Google Inc., or Apple iCloud provided by Apple Inc. of Cupertino, Calif.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 102 may access SaaS resources through the use of web-based user interfaces, provided by a web browser (e.g. Google Chrome, Microsoft Internet Explorer, or Mozilla Firefox provided by Mozilla Foundation of Mountain View, Calif.). Clients 102 may also access SaaS resources through smartphone or tablet applications, including e.g., Salesforce Sales Cloud, or Google Drive App. Clients 102 may also access SaaS resources through the client operating system, including e.g. Windows file system for Dropbox.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

The client 102 and server 106 may be deployed as and/or executed on any type and form of computing device, e.g., a computer, network device or appliance capable of communicating on any type and form of network and performing the operations described herein.

Figure 1C:
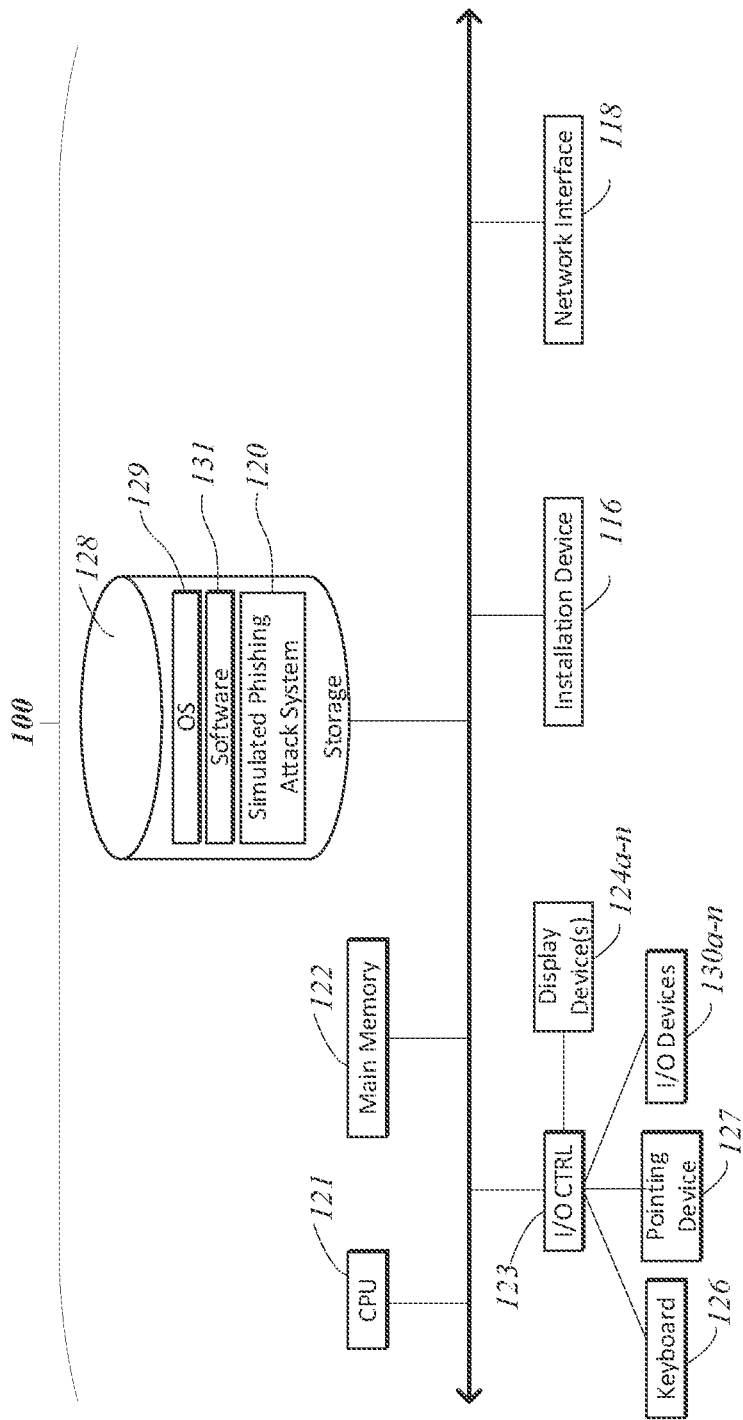
FIGS. 1C and 1D are block diagrams depicting embodiments of computing devices useful in connection with the methods and systems described herein.
Figure 1D:
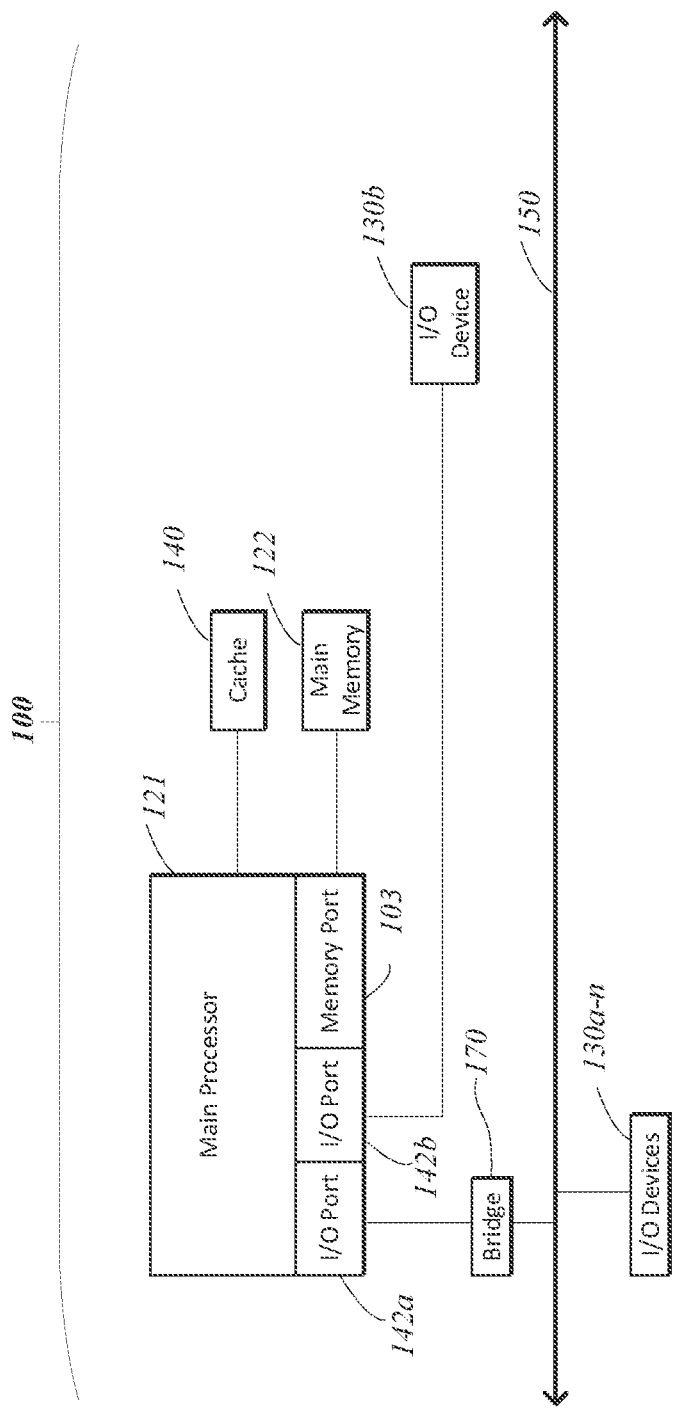

FIGS. 1C and 1D depict block diagrams of a computing device 100 useful for practicing an embodiment of the client 102 or a server 106. As shown in FIGS. 1C and 1D, each computing device 100 includes a central processing unit 121, and a main memory unit 122. As shown in FIG. 1C, a computing device 100 may include a storage device 128, an installation device 116, a network interface 118, and I/O controller 123, display devices 124a-124n, a keyboard 126 and a pointing device 127, e.g., a mouse. The storage device 128 may include, without limitation, an operating system 129, software 131, and a software of a simulated phishing attack system 120. As shown in FIG. 1D, each computing device 100 may also include additional optional elements, e.g., a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, e.g.: those manufactured by Intel Corporation of Mountain View, Calif.; those manufactured by Motorola Corporation of Schaumburg, Ill.; the ARM processor and TEGRA system on a chip (SoC) manufactured by Nvidia of Santa Clara, Calif.; the POWER7 processor, those manufactured by International Business Machines of White Plains, N.Y.; or those manufactured by Advanced Micro Devices of Sunnyvale, Calif. The computing device 100 may be based on any of these processors, or any other processor capable of operating as described herein. The central processing unit 121 may utilize instruction level parallelism, thread level parallelism, different levels of cache, and multi-core processors. A multi-core processor may include two or more processing units on a single computing component. Examples of multi-core processors include the AMD PHENOM IIX2, INTER CORE i5 and INTEL CORE i7.

Main memory unit 122 may include on or more memory chips capable of storing data and allowing any storage location to be directly accessed by the microprocessor 121. Main memory unit 122 may be volatile and faster than storage 128 memory. Main memory units 122 may be Dynamic Random-Access Memory (DRAM) or any variants, including static Random-Access Memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 122 or the storage 128 may be non-volatile; e.g., non-volatile read access memory (NVRAM), flash memory non-volatile static RAM (nvSRAM), Ferro-electric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 122 may be based on any of the above described memory chips, or any other available memory chips capable of operating as described herein. In the embodiment shown in FIG. 1C, the processor 121 communicates with main memory 122 via a system bus 150 (described in more detail below). FIG. 1D depicts an embodiment of a computing device 100 in which the processor communicates directly with main memory 122 via a memory port 103. For example, in FIG. 1D the main memory 122 may be DRDRAM.

FIG. 1D depicts and embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1D, the processor 121 communicates with various I/O devices 130 via a local system bus 150. Various buses may be used to connect the central processing unit 121 to any of the I/O devices 130, including a PCI bus, a PCI-X bus, or a PCI-Express bus, or a NuBus. For embodiments in which the I/O device is a video display 124, the processor 121 may use an Advanced Graphic Port (AGP) to communicate with the display 124 or the I/O controller 123 for the display 124. FIG. 1D depicts and embodiment of a computer 100 in which the main processor 121 communicates directly with I/O device 130b or other processors 121' via HYPER-TRANSPORT, RAPIDIO, or INFINIBAND communications technology. FIG. 1D also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex cameras (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130a-130n may include a combination of multiple input or output devices, including, e.g., Microsoft KINECT, Nintendo Wiimote for the WII, Nintendo WII U GAMEPAD, or Apple iPhone. Some devices 130a-130n allow gesture recognition inputs through combining some of the inputs and outputs. Some devices 130a-130n provide for facial recognition which may be utilized as an input for different purposes including authentication and other commands. Some devices 130a-130n provide for voice recognition and inputs, including, e.g., Microsoft KINECT, SIRI for iPhone by Apple, Google Now or Google Voice Search, and Alexa by Amazon.

Additional devices 130a-130n have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices 130a-130n, display devices 124a-124n or group of devices may be augmented reality devices. The I/O devices may be controlled by an I/O controller 123 as shown in FIG. 1C. The I/O controller may control one or more I/O devices, such as, e.g., a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices. In further embodiments, a I/O device 130 may be a bridge between the system bus 150 and an external communication bus, e.g. a USB bus, a SCSI bus, a FireWire bus, an Ethernet bus, a Gigabit Ethernet bus, a Fiber Channel bus, or a Thunderbolt bus.

In some embodiments, display devices 124a-124n may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or auto stereoscopy. Display devices 124a-124n may also be a head-mounted display (HMD). In some embodiments, display devices 124a-124n or the corresponding I/O controllers 123 may be controlled through or have hardware support for OPENGL or DIRECTX API or other graphics libraries.

In some embodiments, the computing device 100 may include or connect to multiple display devices 124a-124n, which each may be of the same or different type and/or form. As such, any of the I/O devices 130a-130n and/or the I/O controller 123 may include any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may include multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices 100a or 100b connected to the computing device 100, via the network 104. In some embodiments, software may be designed and constructed to use another computer's display device as a second display device 124a for the computing device 100. For example, in one embodiment, an Apple iPad may connect to a computing device 100 and use the display of the device 100 as an additional display screen that may be used as an extended desktop. One ordinarily skilled in the art will recognize and appreciate the various ways and embodiments that a computing device 100 may be configured to have multiple display devices 124a-124n.

Referring again to FIG. 1C, the computing device 100 may comprise a storage device 128 (e.g. one or more hard disk drives or redundant arrays of independent disks) for storing an operating system or other related software, and for storing application software programs such as any program related to the software 120. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 128 may be non-volatile, mutable, or read-only. Some storage device 128 may be internal and connect to the computing device 100 via a bus 150. Some storage device 128 may be external and connect to the computing device 100 via a I/O device 130 that provides an external bus. Some storage device 128 may connect to the computing device 100 via the network interface 118 over a network 104, including, e.g., the Remote Disk for MACBOOK AIR by Apple. Some client devices 100 may not require a non-volatile storage device 128 and may be thin clients or zero clients 102. Some storage device 128 may also be used as an installation device 116 and may be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net.

Client device 100 may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on a client device 102. An application distribution platform may include a repository of applications on a server 106 or a cloud 108, which the clients 102a-102n may access over a network 104. An application distribution platform may include application developed and provided by various developers. A user of a client device 102 may select, purchase and/or download an application via the application distribution platform.

Furthermore, the computing device 100 may include a network interface 118 to interface to the network 104 through a variety of connections including, but not limited to, standard telephone lines LAN or WAN links (e.g., 802.11, T1, T3, Gigabit Ethernet, InfiniBand), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMAX and direct asynchronous connections). In one embodiment, the computing device 100 communicates with other computing devices 100' via any type and/or form of gateway or tunneling protocol e.g. Secure Socket Layer (SSL) or Transport Layer Security (TLS), or the Citrix Gateway Protocol manufactured by Citrix Systems, Inc. The network interface 118 may comprise a built-in network adapter, network interface card, PCMCIA network card, EXPRESSCARD network card, card bus network adapter, wireless network adapter, USB network adapter, modem or any other device suitable for interfacing the computing device 100 to any type of network capable of communication and performing the operations described herein.

A computing device 100 of the sort depicted in FIGS. 1B and 1C may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, WINDOWS 8 and WINDOW 10, all of which are manufactured by Microsoft Corporation of Redmond, Wash.; MAC OS and iOS, manufactured by Apple, Inc.; and Linux, a freely-available operating system, e.g. Linux Mint distribution ("distro") or Ubuntu, distributed by Canonical Ltd. of London, United Kingdom; or Unix or other Unix-like derivative operating systems; and Android, designed by Google Inc., among others. Some operating systems, including, e.g., the CHROME OS by Google Inc., may be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a gaming system. For example, the computer system 100 may comprise a PLAYSTATION 3, or PERSONAL PLAYSTATION PORTABLE (PSP), or a PLAYSTATION VITA device manufactured by the Sony Corporation of Tokyo, Japan, or a NINTENDO DS, NINTENDO 3DS, NINTENDO WII, or a NINTENDO WII U device manufactured by Nintendo Co., Ltd., of Kyoto, Japan, or an XBOX 360 device manufactured by Microsoft Corporation.

In some embodiments, the computing device 100 is a digital audio player such as the Apple IPOD, IPOD Touch, and IPOD NANO lines of devices, manufactured by Apple Computer of Cupertino, Calif. Some digital audio players may have other functionality, including, e.g., a gaming system or any functionality made available by an application from a digital application distribution platform. For example, the IPOD Touch may access the Apple App Store. In some embodiments, the computing device 100 is a portable media player or digital audio player supporting file formats including, but not limited to, MP3, WAV, M4A/AAC, WMA Protected AAC, RIFF, Audible audiobook, Apple Lossless audio file formats and .mov, .m4v, and .mp4 MPEG-4 (H.264/MPEG-4 AVC) video file formats.

In some embodiments, the computing device 100 is a tablet e.g. the IPAD line of devices by Apple; GALAXY TAB family of devices by Samsung; or KINDLE FIRE, by Amazon.com, Inc. of Seattle, Wash. In other embodiments, the computing device 100 is an eBook reader, e.g. the KINDLE family of devices by Amazon.com, or NOOK family of devices by Barnes & Noble, Inc. of New York City, N.Y.

In some embodiments, the communications device 102 includes a combination of devices, e.g. a smartphone combined with a digital audio player or portable media player. For example, one of these embodiments is a smartphone, e.g. the iPhone family of smartphones manufactured by Apple, Inc.; a Samsung GALAXY family of smartphones manufactured by Samsung, Inc; or a Motorola DROID family of smartphones. In yet another embodiment, the communications device 102 is a laptop or desktop computer equipped with a web browser and a microphone and speaker system, e.g. a telephony headset. In these embodiments, the communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in the network 104 is monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Security Awareness Training Systems and Methods

The following describes systems and methods of minimizing organization risk in the case of a cybersecurity attack, through computer-based simulation of cybersecurity attacks, incident response tracking and incident response training provided responsive to the simulation outcome.

A system can be configured to simulate a cybersecurity attack. A server may have various antivirus and anti-malware software and systems installed which can intercept many types of cybersecurity attacks. However phishing emails, chat messages, and other Internet based communications can compel a user to take an action, such as opening an attachment or clicking a link, which will install malware in the computer system.

A company, also referred to as a corporation, an organization or an entity, must take immediate steps to limit the harm caused to an organizational network if one or more users fall victim to a cybersecurity attack. Some of these mitigation steps can be automated and performed by system software, however there are mitigation steps that must be taken by members of the organization, for example IT staff, managers, and human resources staff. The actions and responses of people in the organization at the time of an attack can make a measurable difference in the extent of the harm caused. As with other situations where the human element plays a role, practice ensures that the many parts of an organization that need to act in coordination and cooperation do so efficiently and correctly and according to company policies. The effectiveness of a corporation's response to a cybersecurity attack should therefore be able to be tested with a simulation that is an integrated part of a security awareness training system, with follow on remedial training for people in roles of responsibility for how they responded to the simulated attack.

A security awareness system may provide computer-based training to users to educate them about cybersecurity attacks such as phishing and how to react to them. This training may be referred to as "electronic training" or simply "training". The system may vary the quantity, frequency, type, sophistication, content, timing, and combination of training. A set of training emails, text messages, phone calls, video and/or Internet based communications ("electronic training content") sent to one or more users may be referred to as a training campaign. In some implementations, some or all of the electronic training content in a training campaign may be used to inform a user or group of users about risks and/or best practices and/or organizational policies for a particular subject. In some examples, all of the electronic training content in a training campaign relates to one particular subject. In embodiments, all of the electronic training content in a training campaign relates to more than one subject in a group of subjects with a common theme. In some implementations, traditional training content, such as posters, handouts, flyers, group seminars, and the like, may be provided in addition or as a complement to electronic training content.

A training campaign may be intended to simulate a breach on an IT system, in order to create a teachable moment where company staff can be measured on how well they know and follow policies related to cybersecurity attacks. In some implementations, electronic training can be configured to execute a known form of cybersecurity attack for which there is an organizational policy in place for handling such an attack. In examples, the simulated cybersecurity attack, for example a simulated ransomware attack, may use encryption keys that are known, such that upon the completion of the training exercise, encrypted files can be decrypted. In some embodiments, a training campaign may involve users that are not part of the IT response system, for example by including a simulated phishing campaign where messages look like genuine messages from internal IT systems, external platforms, or other trusted senders in an attempt to lure the user to interact with it. If one or more users interact with the simulated phishing message, then the security awareness system activates the cybersecurity attack such that the organizational response can be tested. In other examples, the security awareness system itself instigates the cybersecurity attack without relying on user involvement, for example the system installs malware or ransomware on one or more computer systems of users, in order to test the organizational response.

In embodiments, the security awareness system can monitor the organizational response to determine if the response follows the organizational policy, and in examples, the system can track the timing of various responses that are part of the entity response to determine how quickly the various groups in the organization respond. The response of the organization or entity as a whole may be given a score, and in examples, if the score does not meet a threshold, then the members of the organization that have a role in the response to a cybersecurity attack may be provided with security incident response training by the security awareness system. In embodiments, individual users that have a role in the response to a cybersecurity attack are given a score that represents their specific response as measured against their assigned responses according to the organizational policy for responding to cybersecurity attacks. If the score of the individual user does not meet a threshold, then the user may be provided with security incident response training by the security awareness In some implementations, the system may adaptively learn the best method (e.g., set of steps) and/or the best combination of cybersecurity attacks to test the response of the system. The learning process implemented by the system can be trained by observing the behavior of users in the same company or in the same industry, by observing the behavior of all other users of the system, or by observing the behavior of a subset of other users in the system based on one or more attributes of the subset of other users meeting one or more selected criteria.

The system can record when and how the response was performed and can produce reports about the responses that users perform in response to a simulated cybersecurity attack. For example, if the response was for a user of a group of users to isolate a particular computer from the organization network, the system can record which user performed this response and the time it took following the instigation of the cybersecurity attack for the user to take the response. If the response was for a user of a group of users to communicate with a manager or executive of the organization that a cybersecurity attack was taking place, the system can record which user performed this response and the time it took following the instigation of the cybersecurity attack for the user to take the response.

In some implementations, the system may add users that failed to perform responses according to a cybersecurity policy within a given period of time to a groups of users that are scheduled to receive general or targeted remedial training at some time in the future. In some implementations, the system may assign a user attribute to a user that failed to perform responses according to a cybersecurity policy within a given period of time, and user attributes may be used to create query-based groups for future training campaigns. In embodiments, users that failed to perform responses according to a cybersecurity policy within a given period of time may be prevented from being part of a security response team until the user completes remedial training.

A security awareness system may keep logs from previous training campaigns, including all responses performed on a user and all user responses performed, which may in some examples be used to inform future campaigns. A security awareness system may further use information from event logs, for example Windows event logs, as well as learning management system (LMS) analysis, which may inform the security awareness system what training a user has had, where the user performed well, and what the user should know. A security awareness system may use information from industry profiles corresponding to an industry that a user's company is associated with.

In some embodiments, a security awareness system is capable of performing risk analysis of users, groups of users, or a company. For example, a security awareness system may be able to perform a risk profile of a user with respect to their competency in responding to a cybersecurity attack on their organization. In some embodiments, a security awareness system can track events in a company and/or for a user in a company to identify one or more specific types of attacks for which the organizational response does not meet policy or industry standards.

In some embodiments, a security awareness system simulated cybersecurity attack duration is limited to a fixed period of time, for example a fixed number of minutes or hours, in order to minimize the productivity impact on the company. In some embodiments, a security awareness system simulated cybersecurity attack will terminate once a certain percentage of users fail the campaign. In some embodiments, a security awareness system simulated cybersecurity attack stops when a certain percentage of users demonstrate compliance with one or more IT policies or procedures.

Figure 2A:
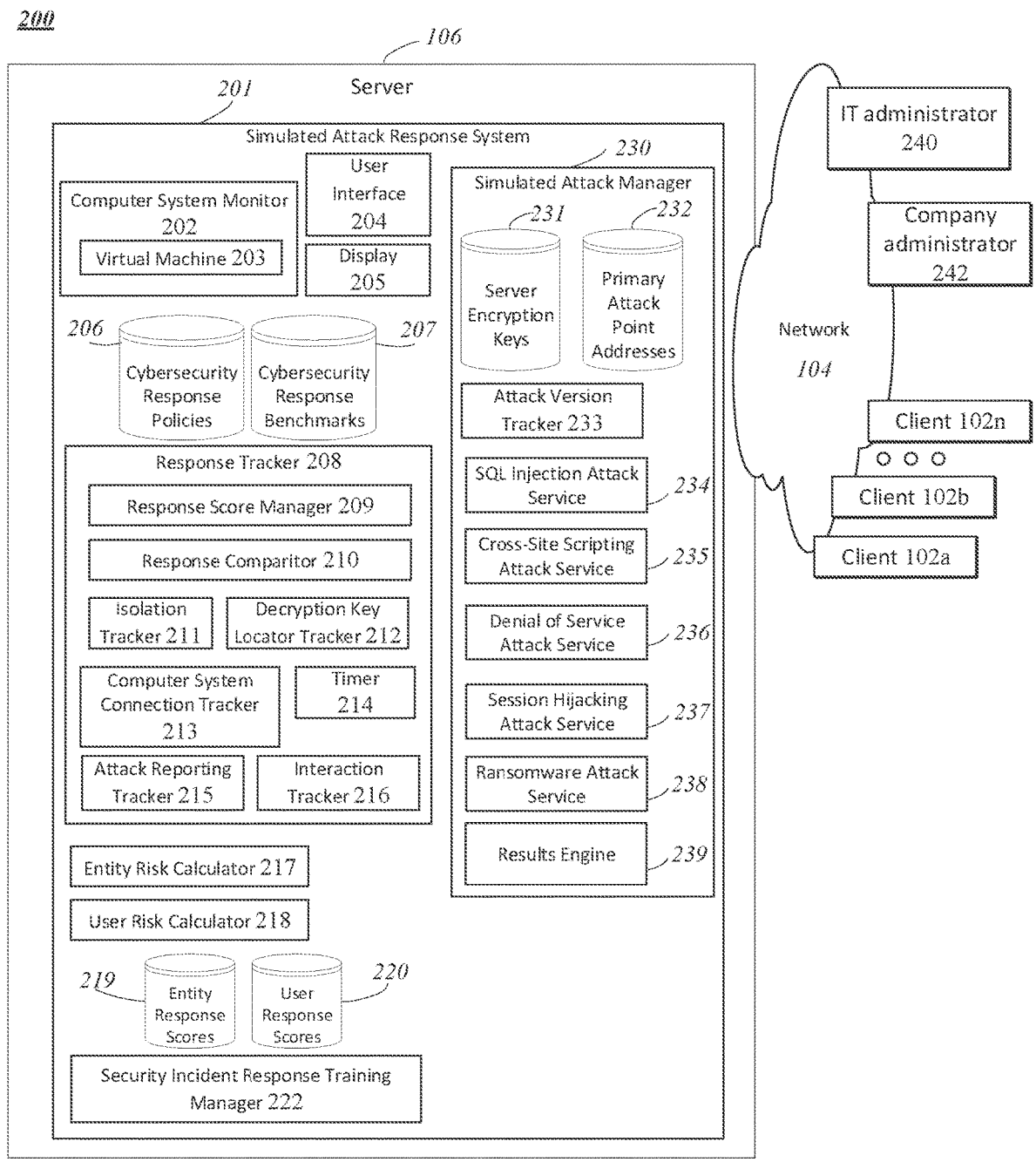
FIG. 2A depicts an implementation of some of the server architecture of an implementation of a system capable of minimizing organization risk in the case of a cybersecurity attack, according to some embodiments.

Referring to FIG. 2A in a general overview, FIG. 2A depicts some of the server architecture of an implementation of a system 200 capable of creating, controlling and executing simulated cybersecurity attacks and electronic training campaigns related to cybersecurity attack responses. In some implementations, system 200 includes server 106 and client 102 and network 104 allowing communication between these system components. Server 106 may include simulated attack response system 201. Simulated attack response system 201 may include computer system monitor 202, which may include virtual machine 203. Simulated attack response system 201 may include user interface 204 and display 205. Simulated attack response system 201 may include response tracker 208, and storages for cybersecurity response policies 206 and cybersecurity response benchmarks 207. Simulated attack response system 201 may include entity risk calculator 217 and user risk calculator 218 and may include storages for entity response scores 219 and user response scores 220. Simulated attack response system 201 may include security incident response training manager 222. Response tracker 208 may include response score manager 209 and response comparator 210. Response tracker 208 may include isolation tracker 211, decryption key locator tracker 212, computer system connection tracker 213, attack reporting tracker 215, interaction tracker 216, and timer 214.

Simulated attack response system 201 may include simulated attack manager 230. Simulated attack manager 230 may include storages for server encryption keys 231 and primary attack point addresses 232. Simulated attack manager 230 may include attack version tracker 233. Simulated attack manager 230 may include SQL injection attack service 234, cross-site scripting attack service 235, denial of service attack service 236, session hijacking attack service 237, ransomware attack service 238, and results engine 239.

In some implementations, system 200 includes one or more IT administrators 240, and one or more company administrators 242, with which server 106 and client 102 can communicate with over network 104.

Referring again to FIG. 2A in more detail, simulated attack response system 201 includes simulated attack manager 230. Simulated attack manager 230 generally manages the process of creating and sending a simulated cybersecurity attack to one or more members of the organization.

Simulated attack manager 230 may communicate with elements simulated attack response system 201, for example to share server encryption keys used in a simulated ransomware attack. In examples, simulated attack manager 230 may communicate with response tracker 208, for example to share primary attack point addresses such that simulated attack response system 201 can identify which users to monitor.

Simulated attack manager 230 may include attack version tracker 233. In some embodiments, attack version tracker 233 may communicate via network 104 with one or more external services or databases to learn information about the latest cybersecurity attacks that have been executed. For example, attack version tracker 233 may utilize a service such as Norse (Norse Corporation, Foster City, Calif.), or other attack intelligence databases to learn details of the types of attacks that are currently taking place around the world. In embodiments, attack version tracker 233 may communicate with simulated attack response system 201 to provide information about the attack vector, for example to determine if the company has a cybersecurity response policy for this type of attack. In embodiments, attack version tracker 233 may communicate with one or more outside companies, databases, or services to determine cybersecurity response benchmarks to various cybersecurity attacks, and may communicate with simulated attack response system 201, which may store these benchmarks in cybersecurity response benchmarks 207.

In embodiments, simulated attack manager 230 may have services for implementing a number of simulated cybersecurity attacks. Examples of services to implement several known attacks SQL injection attack service 234, cross-site scripting attack service 235, denial of service attack service 236, session hijacking attack service 237, and ransomware attack service 238. These are exemplary examples of services that represent the majority of cybersecurity attack vectors that are known in the art at the time of the disclosure, however the disclosure does not limit the functionality of the simulated attack manager 230 to just these services, and it is understood that simulated attack manager 230 may have additional attack services as appropriate to be able to simulate current cybersecurity attacks. Any of these attack services may communicate with one or more clients 102 via network 104 to implement the simulated cybersecurity attack in the organization. In some embodiments, one or more of the attack services may directly interface with the organization network to execute the simulated cybersecurity attack, for example denial of service attack service 236 may directly flood one or more machines or services with requests to overload system resources.

In embodiments, simulated attack manager 230 may include results engine 239. Results engine 239 may track the impact of the cybersecurity attack, for example to understand the extent of the impact of the attack. In some embodiments, results engine 239 communicates with network 104 to determine the number of affected network nodes. In some examples, results engine 239 communicates with simulated attack response system 201, for example to provide time stamps of the various stages of the impact of the simulated cybersecurity attack on the network such that timing of the response with respect to the propagation of the attack can be measured.

Simulated attack response system 201 may include response tracker 208. In some examples, response tracker 208 is configured to track responses from users of an entity to a simulated cybersecurity attack. Response tracker 208 may include isolation tracker 211. Isolation tracker 211 may communicate with server 106 to determine whether one or more clients 102 that were subject to the simulated cybersecurity attack have been isolated from other clients 102 and server 106. In examples, isolation tracker 211 may determine if client 102 has been isolated by determining if client 102 can be reached through the network. Response tracker 208 may include computer system connection tracker 213. In some embodiments, computer system connection tracker 213 monitors one or more servers or system components of the entity to track their connection to one or more other servers or system components of the entity. In embodiments, computer system connection tracker 213 tracks the connection of parts of the system that are indicated as being part of a simulated cybersecurity attack by simulated attack manager 230.

Response tracker 208 may include attack reporting tracker 215. In examples, attack reporting tracker 215 may track communications between users in the entity. For example, attack reporting tracker 215 may track messages (which may any type of message that can be tracked between devices of users, include but not limited to computing devices and telecommunications devices) between IT personal or administrators that are responsible for informing managers and/or executives that a cybersecurity attack is taking place. In embodiments, attack reporting tracker 215 may track messages between IT personal and administrators and outside parties, for example government offices, security agencies, and the like.

Response tracker 208 may include interaction tracker 216. Interaction tracker 216 may be configured to track interactions between clients 102, IT administrators 240, company administrators 242, and other users to determine the flow of communications during and after a simulated cybersecurity attack. Interaction tracker 216 may for example track the content of communications, the timing of communications, which party initiated the communication, and the order of communications. Response tracker 208 may include decryption key locator tracker 212. In some examples, ransomware viruses send unencrypted information which may permit IT systems to sniff out web traffic on the network to detect the decryption key for a ransomware attack. Decryption key locator tracker 212 may monitor a decryption key locator process which monitors network 104 for web traffic to determine if there is unencrypted information which may contain the key to decrypt files. Decryption key locator tracker 212 may track the amount of time it takes for such a process to find the decryption keys, in the case of a simulated cybersecurity attack which sends unencrypted information over the network. Response tracker 208 may include timer 214. Timer 214 works with other services of response tracker 208 to determine the timing of the response with respect to the cybersecurity attack and with respect to other responses to determine, for example, the performance of the cybersecurity attack response.

Response tracker 208 may include response score manager 209 and response comparator 210. Response score manager communicates with other components of simulated attack response system 201 to determine how the organization performed in minimizing the harm from a simulated cybersecurity attack based on following one or more cybersecurity response policies 206. Response comparator 210 may track the response of the organization for a simulated cybersecurity attack against cybersecurity response benchmarks 207, which may include benchmarks from previous simulated cybersecurity attacks for the organization or publicly available benchmarks which include response times for one or more different organizations.

Simulated attack response system 201 may include entity risk calculator 217 and/or user risk calculator 218. In some embodiments, user risk calculator 218 may calculate a score for a user based on the performance in responding to a simulated cybersecurity attack, according to cybersecurity response policies 206 that are relevant for that user or for the role of that user. User risk calculator 217 may generate a user response score to be stored in user response storage 220. User response scores may be used by security incident response training manager 222 to determine electronic training for one or more users that have responsibilities in responding to a cybersecurity attack. Entity risk calculator 217 may consider various responses of the entity as a whole, including one or more user response scores and the reaction of one or more systems of the entity in mitigating the harm of the simulated cybersecurity attack. Entity response scores 219 may be utilized by security incident response training manager 222 in determining electronic training for an entity.

Simulated attack response system 201 may manage various aspects of a simulated cybersecurity attack. For example, simulated attack response system 201 may process input from server 106 and/or may provide access as needed to various applications, modules, and other software components of server 106 to other various applications, modules, and other software components of server 106. Simulated attack response system 201 may monitor and control timing of various aspects of a simulated cybersecurity attack, may process requests for access to simulated cybersecurity attack results, and/or may perform other tasks related to the management of a simulated cybersecurity attack. In some embodiments, simulated attack response system 201 may be integrated with or coupled to memory 122. In some embodiments, memory 122 may include any type and form of storage, such as a database or file system. Memory 122 may store data such as parameters and scripts corresponding to the choices made by server 106 through simulated attack response system 201, e.g. as described above for a particular simulated cybersecurity attack. Simulated attack response system 201 may be an application, service, daemon, routine, or other executable logic for generating simulated cybersecurity attack. In some embodiments, simulated attack response system 201 can be configured to generate messages having the ability to encrypt files on user systems using server encryption keys from server encryption key storage 231.

In an implementation, simulated attack response system 201 may be e.g., another name for a system administrator, such as a security manager, a third-party security consultant, a risk assessor, or any other party that uses simulated attack response system 201 installed on a server. Server 106 may wish to direct a simulated cybersecurity attack interacting with users of an organization. Simulated attack response system 201 may be, for example, a desktop computer, a laptop computer, a mobile device, or any other suitable computing device. Simulated attack response system 201 may be e.g., an application on a device that allows a user of the device to interact with server 106 for e.g. purposes of creating, configuring, tailoring and/or executing a simulated cybersecurity attack and/or viewing and/or processing and/or analyzing the results of a simulated cybersecurity attack.

In an implementation, simulated attack response system 201, when executed, causes a graphical user interface to be displayed. In other embodiments, simulated attack response system 201 allows for user input through a non-graphical user interface, such as a user interface that accepts text or vocal input without displaying an interactive image. A graphical user interface may be displayed on a screen of a mobile phone, or a monitor connected to a desktop or laptop computer or may be displayed on any other display. The user may interact with e.g. the graphical user interface on the device by typing, clicking a mouse, tapping, speaking, or any other method of interacting with a user interface. The graphical user interface on the device may be a web-based user interface provided by a web browser (e.g. Google Chrome (Google, Mountain View, Calif.), Microsoft Internet Explorer (Microsoft, Redmond, Wash.), or Mozilla Firefox (Mozilla Foundation of Mountain View, Calif.), or may be an application installed on a user device capable of opening a network connection to simulated attack response system 201 or may be any other type of interface.

In an implementation, simulated attack response system 201 and/or simulated attack manager 230 and/or server 106 may make choices concerning how simulated cybersecurity attack training is to be carried out. For example, a graphical user interface run by simulated attack manager 230 may be displayed to server 106. An administrator, via server 106, may input parameters for the simulated cybersecurity attack that affect how it will be carried out. For example, via server 106 an administrator may make choices as to which users to include as potential recipients of the simulated cybersecurity attack, the method of determining which users are to be selected as potential recipients of the simulated cybersecurity attack, the timing of various aspects of the simulated cybersecurity attack, whether to use a simulated cybersecurity attack that includes one or a plurality of cybersecurity attack types, how responses from targeted users of the cybersecurity attack should be uniquely identified, and other choices. These choices may be made by selecting options displayed on a graphical user interface from dropdown menus, being presented with choices through a simulated attack wizard, or in any other appropriate manner.

In an implementation, simulated attack response system 201 may allow server 106, such as via application programming interfaces (APIs), to access and/or change settings of an account maintained with any party involved with the cybersecurity response, such as, for example, a third party security service provider, or may allow server 106 to access and/or change settings of an account maintained with a third party security service provider such as one that e.g. manages an database of cybersecurity attack sources and/or types, to view bills and/or make payments to a third party security service provider, to perform functions with other third parties involved in the simulated cybersecurity attack, or provide any other functions that would be appropriate for facilitating communications between server 106 and any other parties involved in the simulated cybersecurity attack.

Simulated attack manager 230 may process input from server 106 and/or may provide access as needed to various applications, modules, and other software components of server 106 to other various applications, modules, and other software components of server 106. Simulated attack manager 230 may monitor and control inputs and various other system aspects. In some embodiments, simulated attack manager 230 may be integrated with or coupled to memory 122. In some embodiments, the memory may include any type and form of storage, such as a database or file system. Memory 122 may store data such as parameters and scripts corresponding to the choices made by server 106 through simulated attack manager 230, e.g. as described above for a particular simulated cybersecurity attack. Attack version tracker 233, SQL injection attack service 234, cross-site scripting attack service 235, denial of service attack servicer 236, session hijacking attack service 237, and/or ransomware attack service 238 may be an application, service, daemon, routine, or other executable logic. Attack version tracker 233, SQL injection attack service 234, cross-site scripting attack service 235, denial of service attack servicer 236, session hijacking attack service 237, and/or ransomware attack service 238 may be integrated with or coupled to memory or a memory store or otherwise a storage, such as a database.

Simulated attack response system may include computer system monitor 202, which may comprise virtual machine 203. Computer system monitor 202 may track input and output, active applications, active processes, processing load, and other metrics of one or more computer systems on network 104, for example to determine the likelihood that one or more computer systems has been compromised by a simulated cybersecurity attack. Simulated attack response system 201 may include user interface 204 and display 205, which may be useful in allowing an administrator, such as an IT administrator 240 or a company administrator 242 to program, command, monitor, or control simulated attack response system 201, for the purpose of providing simulated cybersecurity attacks and electronic security incident response training.

Each of server 106, simulated attack response system 201, computer system monitor 202, virtual machine 203, user interface 204, display 205, response tracker 208, response score manager 209, response comparator 210, isolation tracker 211, decryption key locator tracker 212, computer system connection tracker 213, timer 214, attack reporting tracker 215, interaction tracker 216, entity risk calculator 217, user risk calculator 218, simulator attack manager 230, attack version tracker 233, SQL injection attack service 235, cross-site scripting attack service 235, denial of service attack service 236, session hijacking attack service 237, ransomware attack service 238, and results engine 239 may comprise a program, service, task, script, library, application or any type and form of executable instructions or code executable on one or more processors.

Each of server 106, simulated attack response system 201, computer system monitor 202, virtual machine 203, user interface 204, display 205, response tracker 208, response score manager 209, response comparator 210, isolation tracker 211, decryption key locator tracker 212, computer system connection tracker 213, timer 214, attack reporting tracker 215, interaction tracker 216, entity risk calculator 217, user risk calculator 218, simulator attack manager 230, attack version tracker 233, SQL injection attack service 235, cross-site scripting attack service 235, denial of service attack service 236, session hijacking attack service 237, ransomware attack service 238, and results engine 239 may be combined into one or more modules, applications, programs, services, tasks, scripts, libraries, applications, or executable code.

Server 106 may be a part of a cluster of servers 106. In some embodiments, tasks performed by server 106 may be performed by a plurality of servers. These tasks may be allocated among the plurality of servers by an application, service, daemon, routine, or other executable logic for task allocation. The server 106 may include a processor and memory. Some or all of server 106 may be hosted on cloud 108, for example by Amazon Web Services (AWS).

Figure 2B:
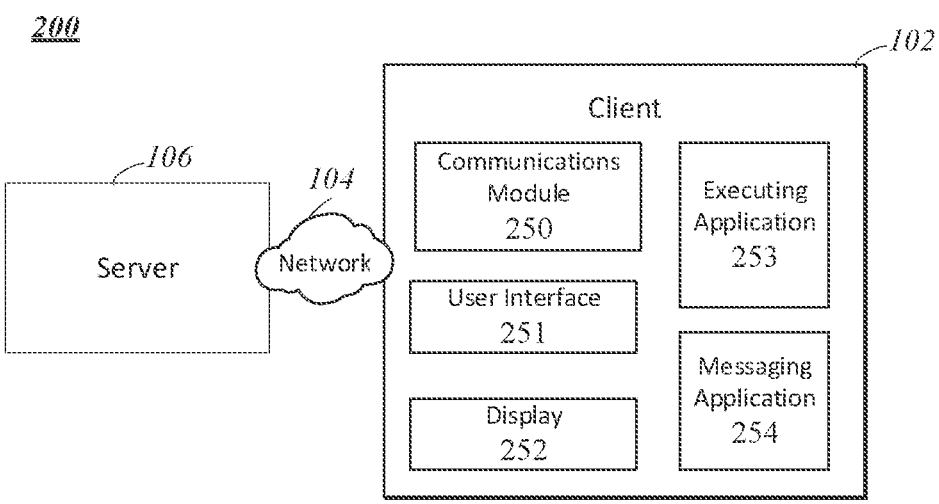
FIG. 2B depicts an implementation of some of the client architecture of an implementation of a system capable of minimizing organization risk in the case of a cybersecurity attack, according to some embodiments.

Referring to FIG. 2B, in a general overview, FIG. 2B depicts some of the client architecture of an implementation of a system 200 capable of creating, controlling and executing electronic campaigns, searching and testing domains, and creating, controlling and utilizing risk scores with based on domain spoof risk and user behavior. The system 200 also includes client 102. Client 102 may include communications module 250, user interface 251, display 252, executing application 253, and messaging application 254.

Referring to FIG. 2B, in more detail, a client may fall victim to a simulated cybersecurity attack. For example, the client may be an employee, member, or independent contractor for an organization. Client 102 may be any device used by the client. The client does not need to own the device for it to be considered a client device 102. The client 102 may be any computing device, such as a desktop computer, a laptop, a mobile device, or any other computing device. In some embodiments, the client 102 may be a server or set of servers accessed by the client. For example, the client may be the employee or a member of an organization. The client may access a server that is e.g. owned or managed or otherwise associated with the organization. Such a server may be a client 102.

In some implementations, client 102 may include communications module 250. This may be a library, application programming interface (API), a set of scripts, or any other code that may facilitate communications between client 102 and any of server 106, a third-party server, or any other server. In some embodiments, communications module 250 determines when to transmit information from client 102 to external servers via network 104. In some embodiments, communications module 250 receives information from server 106 via network 104. In some embodiments, the information transmitted or received by communications module 250 may correspond to a message, such as an email, generated or received by messaging application 254.

In some embodiments, client 102 may include user interface 251 such as a keyboard, a mouse, a touch screen, or other appropriate user interface. This may be a user interface that is e.g. connected directly to client 102, such as, for example, a keyboard connected to a mobile device, or may be connected indirectly to client 102, such as, for example, a user interface of a client device used to access a server client 102. The client may include display 252, such as a screen, a monitor connected to the device in any manner, or any other appropriate display.

In an implementation, client 102 may include messaging application 254. Messaging application 254 may be any application capable of viewing, editing, and/or sending messages. For example, messaging application 254 may be an instance of an application that allows viewing of a desired message type, such as any web browser, a Gmail™ application (Google, Mountain View, Calif.), Microsoft Outlook™ (Microsoft, Mountain View, Calif.), WhatsApp™ (Facebook, Menlo Park, Calif.), a text messaging application, or any other appropriate application. In some embodiments, messaging application 254 can be configured to display spoofed domain electronic training.

In some examples, client 102 may receive simulated phishing messages via messaging application 254, display received messages for the user using display 252, and accept user interaction via user interface 251 responsive to displayed messages. In some embodiments, if the user interacts with a simulated cybersecurity attack, server 106 may encrypt files on the client device.

Each of client 102, user interface 251, communications module 250, messaging application 154, and executing application 253 may comprise a program, service, task, script, library, application or any type and form of executable instructions or code executable on one or more processors. Any of client 102, user interface 251, communications module 250, messaging application 154, and executing application 253 may be combined into one or more modules, applications, programs, services, tasks, scripts, libraries, applications, or executable code.

Referring to FIG. 3 in a general overview, FIG. 3 depicts an implementation of a method 300 for minimizing organization risk in the case of a cybersecurity attack, through computer-based simulation of cybersecurity attacks, incident response tracking and incident response training provided responsive to the simulation outcome. In step 310, method 300 may include executing a simulated cybersecurity attack on computer systems associated with users on a network of an entity. In some examples, responsive to monitoring the computer systems and the network, method 300 may include tracking a plurality of responses to the simulated cybersecurity attack (step 320). In response to the responses, method 300 may include validating whether a predetermined set of interactions have occurred with at least one of the computer systems or components of the network to minimize the impact of the simulated cybersecurity attack on the entity (step 330). In some embodiments, method 300 may include recording a length of time for the entity to perform one or more predetermined responses (step 340). In step 350, method 300 may include providing electronic cybersecurity response training to one or more users of an entity based on the length of time for users of the entity to perform one or more predetermined responses.

Referring to FIG. 3 in more detail, method 300 may include executing a simulated cybersecurity attack on computer systems associated with users on a network of an entity (step 310). In some embodiments, simulated attack manager 230 may determine a primary attack point, for example using addresses from primary attack point addresses 232. In some embodiments, the primary attack point for a simulated cybersecurity attack may be chosen based on the propensity of the user to fall victim to a phishing attack. In some embodiments, attack version tracker 233 may identify a new version of an attack which would be managed by an existing cybersecurity response policy and may use a new version of the attack for the simulated cybersecurity attack. In some embodiments, simulated attack manager 230 may utilize SQL injection attack service 234 to bypass authentication for a database, to modify or corrupt data, to delete data, or to otherwise perform a response consistent with a SQL injection cybersecurity attack. In embodiments, simulated attack response system 201 will create a backup of the database in advance of a simulated cybersecurity attack that involves changes to the database, such that the database can be restored after the simulated cybersecurity attack.

In some embodiments, simulated attack manager 230 may utilize cross-site scripting attack service 235. In examples, cross-site scripting attack service 235 may inject malicious code into a website, such as a common website utilized by company users, or a company domain itself. In embodiments, the injected code runs in a user's browser when they visit the compromised website. In embodiments, cross-site scripting attack service 235 injects malicious code into a comment or a script that code automatically run, for example a link to a malicious JavaScript in a comment on a blog.

In some embodiments, simulated attack manager 230 may utilize denial of service attack service 236. In some embodiments, denial of service attack service 236 may use a third-party service to carry out a distributed denial of service attack against one or more servers of the entity. In examples, denial of service attack service 236 may attempt to use up all available network bandwidth such that legitimate traffic can no longer pass to/from targeted systems. In embodiments, denial of service attack service may target network infrastructure devices, such as switches, routers, wireless access points etc. such that they no longer allow network traffic to flow to/from targeted systems as usual.

In some embodiments, simulated attack manager 230 may utilize session hijacking attack service 237 to perform a man-in-the-middle attack by using the session ID and posing as the client device making requests to company web servers and intercepting information in both directions. In some embodiments, simulated attack manager 230 may utilize ransomware attack service 238 to perform a simulated cybersecurity attack. In some examples, individual client devices may be encrypted. In some examples, the clients are chosen for the simulated ransomware attack based on their user response score, or a user risk score related to security awareness. In some examples, ransomware attack service 238 may encrypted mapped drives which may be stored on a network device or a server. In embodiments, ransomware attack service may send demands for ransom to one or more users in an entity, for example to one or more IT administrators 240, one or more company administrators 242, and or one or more executives or managers of the organization. In some embodiments, a simulated cybersecurity attack such as a simulated ransomware attack uses encryption keys from server encryption keys storage 231, which are encryption keys that can be used later to decrypt the files following the completion of the simulated ransomware attack.

Method 300 may include tracking a plurality of responses to the simulated cybersecurity attack (step 320). In some examples, each of the plurality of responses identify an interaction with at least one of the plurality of computer systems, devices, or components of the network. In some examples, server 106 records a length of time for one or more users of the entity (also referred to as "the entity") to perform one or more responses of a predetermined set of responses. In some examples, a server creates and modifies a set of responses which is stored at the server and which serves as a policy for reacting to various cybersecurity attacks, in order to minimize the impact of the cybersecurity attack on the entity. In embodiments, the server determines which of the predetermined steps is important to minimize the impact of the attack. For example when the server is tracking responses, it could for example apply a greater weight to these responses or to the timing of these responses in determining an entity risk score or response score. In embodiments, this stored set of responses is referred to as a "predetermined set of response", and the performance of the entity in responding to a cybersecurity attack is determined based on their compliance to the predetermined set of responses. In some embodiments, the one or more responses to a simulated cybersecurity attack includes identification of a primary attack point of the simulated security attack, disconnection of one or more infected computer systems from the network, the storing or archiving of locked files, identification of a version of the cybersecurity attack, location of the ransomware for a simulated ransomware attack, location of decryption keys for a simulated ransomware attack, and/or reporting of the simulated cybersecurity attack to one or more third parties, including regulatory bodies or law enforcement officials. In some embodiments, the server is configured to record the sequence the entity performs one or more responses of the predetermined set of responses, which may include identification of a primary attack point of the simulated cybersecurity attack, disconnection of one or more infected computer systems from the network, and/or quarantine of one or more computers that are associated with the one or more infected computer systems.

Method 300 may include validating whether a predetermined set of interactions have occurred with at least one of the computer systems or components of the network to minimize the impact of the simulated cybersecurity attack on the entity (step 330). In some examples, responses of one or more users, IT administrators 240 and company administrators 242 may be validated and compared to the predetermined set of interactions. In some embodiments, the time from the start of the cybersecurity attack to the time of a response which is one of the predetermined set of interactions is tracked. In some examples, the user that responds with one of the predetermined set of interactions is tracked, and users that were responsible to respond with one or more of the predetermined set of interactions but that did not, are assigned remedial training for responding to cybersecurity attacks. In some embodiments, method 300 includes comparing the responses to a benchmark of responses for responding to a cybersecurity attack. The benchmarks may comprise company policies or procedures for an entity, for example the benchmarks may comprise known industry "best practices" for mitigating the harm of a cybersecurity attack.

In some embodiments, server 106 may display a visual comparison of the one or more responses of the entity with the responses that comprise the benchmark. In examples, server 106 may display a visual comparison of the one or more responses of the entity with the one or more responses that are required according to the company policy. Server 106 may provide visual representations of the responses compared to the benchmarks for an entity or for one or more users, IT administrators, or company administrators of the entity. In some examples, server 106 may provide visual representation that compare responses between one or more users, IT administrators, or company administrators of the entity.

In some embodiments, the server may provide information about one or more users who were deficient in responding to the simulated cybersecurity attack. In examples, deficient users may be registered in electronic remedial training about cybersecurity attacks. In examples, deficient users may be assigned an attribute which can be used by a security awareness system in generating a query-based group of users to receive electronic remedial training about cybersecurity attacks.

Method 300 may include recording a length of time for the entity to perform one or more predetermined responses (step 340). In some examples, the server may display a visual representation of the time it took the entity to provide one or more responses and the time that the benchmark required that entities provided the one or more responses. In embodiments, server 106 may provide visual representations of the time of the responses compared to the benchmarks for an entity or for one or more users, IT administrators, or company administrators of the entity. In some examples, server 106 may provide visual representation that compares the time of responses between one or more users, IT administrators, or company administrators of the entity. In some embodiments, the predetermined responses are for isolating ransomware. In some embodiments, method 300 may include the use of micro-segmentation or the deployment of antibot software to isolate ransomware.

In some examples, method 300 may include providing electronic cybersecurity response training to one or more users of an entity based on the length of time for users of the entity to perform one or more predetermined responses (step 350). In embodiments, security incident response training manager 222 may provide training via a user pop up created by user interface 251. Training generated security incident response training manager 222 may be of any appropriate format. For example, training may be provided in the form of email messages, text or SMS messages, messages used by particular messaging applications such as, e.g. WhatsApp™ (Facebook, Menlo Park, Calif.), or any other type of message. Training may be provided as videos, documents, interactive games, interactive chats, or other content types to be used in a particular training campaign selected by e.g. server 106 using simulated attack response system 201. Messages and/or content may be generated in any appropriate manner, e.g. by running an instance of an application that generates the desired message type, such as running e.g. a Gmail™ application (Google, Mountain View, Calif.), Microsoft Outlook™ (Microsoft, Redmond, Wash.), a text messaging application, or any other appropriate application. The messages may be generated by running a messaging application on e.g. virtual machine 203 or may simply be run on an operating system of server 106 or may be run in any other appropriate environment. The messages may be generated to be formatted consistent with specific messaging platforms, for example Outlook 365 (Microsoft, Redmond, Wash.), Outlook Web Access (OWA) (Microsoft, Redmond, Wash.), Webmail, iOS (Apple, Cupertino, Calif.), Gmail client (Google, Mountain View, Calif.), and so on. In some embodiments, security incident response training manager 222 can be configured to generate messages having the ability to traverse users who interact with the messages to a specific landing page to provide further training.

In some embodiments, security incident response training manager can select any number of employees who should be targeted by a simulated cybersecurity attack test, can create a user group and store this user group in memory 122. Security incident response training manager 222 can retrieve this information from memory 122 and can address a respective target identified in the information stored in the memory 122. That is, security incident response training manager 222 can generate the emails such that the "From:" and "Subject:" fields of each email are identical, while the "To:" field is adjusted according to the desired targets.

A user may be selected for security incident response training based on a time-based determination enabled by timer 214. For example, the user may be selected because of the amount of time that passed since the simulated cybersecurity attack and when they performed the response they were responsible to perform was too great. In embodiments, a user or a group of users may be selected for security incident response training based on user response scores 220 and/or entity response scores 219. In some examples, a user may be selected for electronic training because users that share similar characteristics to the user have been historically more prone to not meet cybersecurity response benchmarks.

The systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMS, RAMS, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

We claim:

1. A method comprising:
identifying, by one or more processors, a set of expected responses from storage for reducing an impact of a simulated attack to be executed against one or more computer systems on a network;
monitoring, by the one or more processors, responses to the simulated attack executed against the one or more computer systems on the network;
comparing, by the one or more processors, the responses to the simulated attack to the set of expected responses for reducing the impact of the simulated attack;
determining, by one or more processors, which one or more of the set of expected responses for reducing the impact of the simulated attack have occurred or not occurred among the responses to the simulated attack; and
providing, by the one or more processors for display on a display device, information on compliance with the set of expected responses, wherein the information identifies which of the one or more of the set of expected responses for-reducing the impact of the simulated attack have occurred or not occurred.

2. The method of claim 1, wherein the set of expected responses are identified as to minimize an impact of the simulated attack.

3. The method of claim 1, further comprising monitoring, by the one or more processors, a timing of the responses to the simulated attack.

4. The method of claim 3, further comprising comparing, by the one or more processors, the timing of the responses to timing associated with the set of expected responses.

5. The method of claim 3, further comprising providing, by the one or more processors for display on the display device, information identifying the timing of the responses.

6. The method of claim 1, wherein the set of expected responses comprise one or more of identification of a primary attack point of the simulated attack, disconnection of one or more infected computer systems from the network, identification of a version of ransomware, isolation of the ransomware, location of decryption keys or reporting to one or more third parties.

7. The method of claim 1, wherein the responses comprise an interaction with at least one of the one or more computer systems or a component of the network.

8. The method of claim 1, further comprising determining, by the one or more processors, a performance of an entity with respect to the simulated attack based at least on the entity's compliance to the set of expected responses.

9. The method of claim 8, further comprising providing, by the one or more processors for display on the display device, a visual representation of a time that the entity took to provide the responses and the time that a benchmark specified the entity to provide the responses.

10. The method of claim 1, wherein the simulated attack is a simulated ransomware attack.

11. A system comprising:
one or more processors, coupled to memory and configured to:
identify a set of expected responses from storage for reducing an impact of a simulated attack to be executed against one or more computer systems on a network;
monitor responses to the simulated attack executed against the one or more computer systems on the network;
compare the responses to the simulated attack to the set of expected responses for reducing the impact of the simulated attack;
determine which one or more of the set of expected responses for reducing the impact of the simulated attack have occurred or not occurred among the responses to the simulated attack; and
provide for display on a display device information on compliance with the set of expected responses, wherein the information identifies which of the one or more of the set of expected responses for responding to the simulated attack have occurred or not occurred.

12. The system of claim 11, wherein the set of expected responses minimize an impact of the simulated attack.

13. The system of claim 11, wherein the one or more processors are further configured to monitor a timing of the responses to the simulated attack.

14. The system of claim 13, wherein the one or more processors are further configured to compare the timing of the responses to timing associated with the set of expected responses.

15. The system of claim 13, wherein the one or more processors are further configured to provide, for display on the display device, information identifying the timing of the responses.

16. The system of claim 11, wherein the set of expected responses comprises one or more of identification of a primary attack point of the simulated attack, disconnection of one or more infected computer systems from the network, identification of a version of ransomware, isolation of the ransomware, location of decryption keys or reporting to one or more third parties.

17. The system of claim 11, wherein the responses comprises an interaction with at least one of the one or more computer systems or a component of the network.

18. The system of claim 11, wherein the one or more processors are further configured to determine a performance of an entity with respect to the simulated attack based at least on the entity's compliance to the set of expected responses.

19. The system of claim 18, wherein the one or more processors are further configured to provide, for display on the display device, a visual representation of a time that the entity took to provide the responses and the time that a benchmark specified the entity to provide the responses.

20. The system of claim 11, wherein the simulated attack is a simulated ransomware attack.

* * * * *